United States Patent
Liu et al.

(10) Patent No.: US 12,196,686 B1
(45) Date of Patent: Jan. 14, 2025

(54) VORTEX DICHROISM DARK-FIELD CONFOCAL MICROSCOPY MEASUREMENT APPARATUS BASED ON SPIRAL TRANSFORMATION

(71) Applicant: Harbin Institute of Technology, Heilongjiang (CN)

(72) Inventors: Jian Liu, Heilongjiang (CN); Chenguang Liu, Heilongjiang (CN); Zijie Hua, Harbin (CN); Xiaoyu You, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/813,695

(22) Filed: Aug. 23, 2024

(30) Foreign Application Priority Data

Jul. 26, 2024 (CN) .......................... 202411010369.0

(51) Int. Cl.
*G01N 21/88* (2006.01)
*G01N 21/95* (2006.01)
*G02B 21/00* (2006.01)
*G02B 21/10* (2006.01)

(52) U.S. Cl.
CPC ......... *G01N 21/8806* (2013.01); *G01N 21/95* (2013.01); *G02B 21/0036* (2013.01); *G02B 21/0052* (2013.01); *G02B 21/008* (2013.01); *G02B 21/10* (2013.01); *G01N 2021/8822* (2013.01)

(58) Field of Classification Search
None
See application file for complete search history.

(56) References Cited

U.S. PATENT DOCUMENTS

2014/0268117 A1 * 9/2014 Kolchin ................ G06T 7/0012
703/2

FOREIGN PATENT DOCUMENTS

| CN | 116297485 A | * | 6/2023 | |
| CN | 116482107 A | * | 7/2023 | ............. G01N 21/01 |
| JP | 6655121 B2 | * | 2/2020 | ......... G01N 21/6458 |

* cited by examiner

*Primary Examiner* — Jonathan M Hansen
*Assistant Examiner* — Jarreas Underwood
(74) *Attorney, Agent, or Firm* — M&B IP Analysts, LLC

(57) ABSTRACT

This application provides a vortex dichroism dark-field confocal microscopy measurement apparatus based on spiral transformation. An opposite-order vortex beam generation module is configured to generate a mixed vortex beam, a sample scanning module is configured to irradiate a scanning position of a to-be-measured sample by using the mixed vortex beam, to obtain a sample reflection beam. A spiral transformation module is configured to spatially separate the sample reflection beam to obtain spatially separated beams. A multi-order detection module is configured to detect the spatially separated beams to obtain a vortex dichroism signal at the scanning position. When the scanning position of the to-be-measured sample is defect-free, the vortex dichroism signal is zero. Conversely, when defects are present at the scanning position, the vortex dichroism signal is non-zero. The positive and negative the vortex dichroism signal respectively correspond to the left-handed and right-handed chirality of the defects.

10 Claims, 1 Drawing Sheet

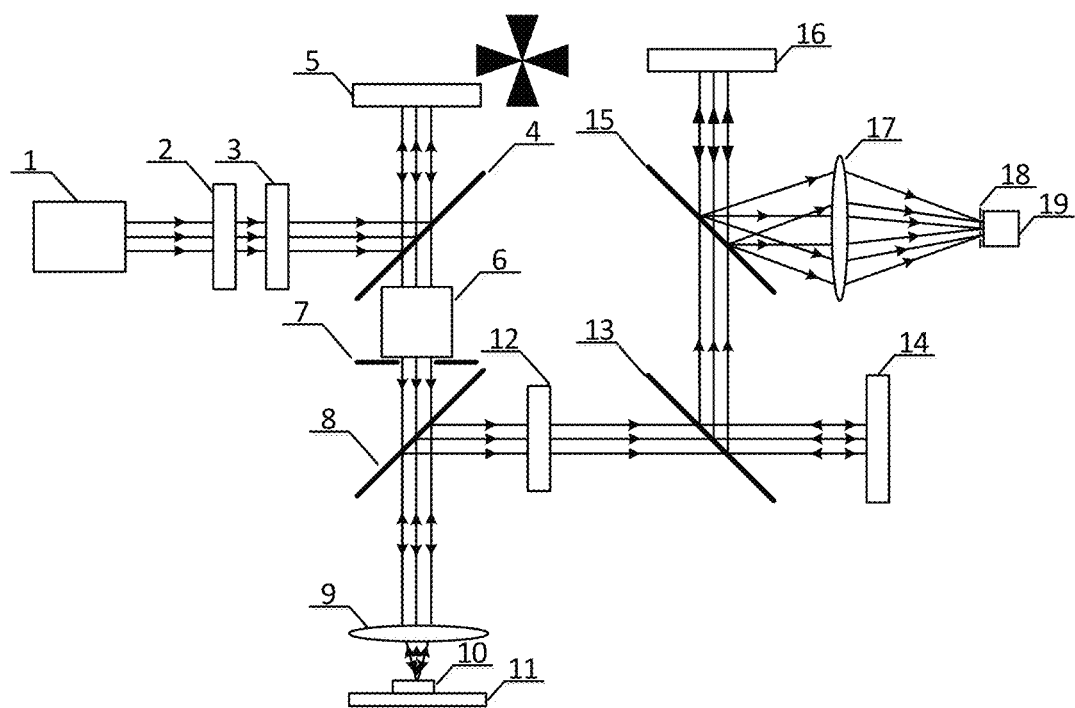

VORTEX DICHROISM DARK-FIELD CONFOCAL MICROSCOPY MEASUREMENT APPARATUS BASED ON SPIRAL TRANSFORMATION

CROSS REFERENCE TO RELATED APPLICATION

This patent application claims the benefit and priority of Chinese Patent Application No. 2024110103690, filed with the China National Intellectual Property Administration on Jul. 26, 2024, the disclosure of which is incorporated by reference herein in its entirety as part of the present application.

TECHNICAL FIELD

This application relates to the technical field of optical precision measurement, and in particular, to a vortex dichroism dark-field confocal microscopy measurement apparatus based on spiral transformation.

BACKGROUND

Interlayer defects (such as holes and layer faults) in three-dimensional (3D) integrated circuits of semiconductors often degrade the electrical performance and lifespan. Accurate detection of these interlayer defects is crucial for ensuring high product yield in 3D integrated circuits.

Confocal microscopy measurement technology is suitable for non-destructive detection in 3D integrated circuits due to the 3D sectioning capability. The dark-field confocal microscopy measurement technology has become essential for non-destructive defect detection in 3D integrated circuits due to advantages such as excellent optical sectioning capability, high imaging resolution, and strong imaging contrast against a dark background. However, conventional optical dark-field confocal microscopy measurement technology exhibits a low response rate to micro-scale defects and is constrained by limitations in information acquisition dimensions. As a result, it can only detect geometric defects (such as scratches and pits) and cannot capture more detailed defect characteristics, leading to insufficient accuracy in defect determination.

Therefore, how to expand detectable defect characteristics and explore the chiral characteristics of interlayer defects in 3D integrated circuits is an urgent problem for technicians in this field.

SUMMARY

The purpose of this application is to provide a vortex dichroism dark-field confocal microscopy measurement apparatus based on spiral transformation, to explore chirality of interlayer defects in 3D integrated circuits.

To achieve the above objective, this application provides the following technical solutions.

This application provides a vortex dichroism dark-field confocal microscopy measurement apparatus based on spiral transformation, including:
an opposite-order vortex beam generation module configured to generate a mixed vortex beam, where the mixed vortex beam includes positive m-order orbital angular momentum and negative m-order orbital angular momentum, and m is a constant;
a sample scanning module configured to irradiate a scanning position of a to-be-measured sample by using the mixed vortex beam, to obtain a sample reflection beam of the scanning position, where the to-be-measured sample is a 3D integrated circuit, and the sample reflection beam includes the positive $m^{th}$-order orbital angular momentum and the negative $m^{th}$-order orbital angular momentum;
a spiral transformation module configured to spatially separate the sample reflection beam to obtain spatially separated beams, where the spatially separated beams include a first beam corresponding to the positive m-order orbital angular momentum and a second beam corresponding to the negative m-order orbital angular momentum, and the first beam and the second beam are separated in position; and
a multi-order detection module configured to detect the spatially separated beams to obtain a vortex dichroism signal at the scanning position, where the vortex dichroism signal is used to indicate whether there is a defect at the scanning position and a defect chirality if a defect exists.

Optionally, the opposite-order vortex beam generation module includes a laser, a half-wave plate, a first polarizer, a first non-polarizing beam splitter, and a first liquid crystal spatial light modulator sequentially arranged in a light propagation direction; the first liquid crystal spatial light modulator is configured to perform phase modulation on a reflection beam of the first non-polarizing beam splitter, to obtain the mixed vortex beam; and the mixed vortex beam is transmitted to the sample scanning module through the first non-polarizing beam splitter.

Optionally, the sample scanning module includes a beam expander, an aperture diaphragm, a second non-polarizing beam splitter, and an objective lens sequentially arranged in a light propagation direction; the objective lens is configured to focus transmission beam of the second non-polarizing beam splitter to the scanning position of the to-be-measured sample, to obtain the sample reflection beam of the scanning position; the sample reflection beam is transmitted by the objective lens and then reflected by the second non-polarizing beam splitter to the spiral transformation module.

Optionally, the sample scanning module further includes a XYZ translation stage; the to-be-measured sample is located on the XYZ translation stage; and the XYZ translation stage is configured to drive the to-be-measured sample to move, to adjust the scanning position of the to-be-measured sample.

Optionally, the spiral transformation module includes a second polarizer, a third non-polarizing beam splitter, a second liquid crystal spatial light modulator, a fourth non-polarizing beam splitter, and a third liquid crystal spatial light modulator sequentially arranged in a light propagation direction; the second liquid crystal spatial light modulator is configured to perform phase modulation on a transmission beam of the third non-polarizing beam splitter to obtain preliminary separated beams; the third liquid crystal spatial light modulator is configured to perform phase modulation on a transmission beam of the fourth non-polarizing beam splitter, to obtain the spatially separated beams; and the spatially separated beams are reflected by the fourth non-polarizing beam splitter to the multi-order detection module.

Optionally, the multi-order detection module includes a focusing lens, a slit array, and a linear array multianode photomultiplier tube sequentially arranged in a light propagation direction; the focusing lens is configured to focus the spatially separated beams to obtain a focused beam; the slit array is configured to filter out defocused background in the focused beam, to obtain a filtered beam; and the linear array multianode photomultiplier tube is configured to perform photoelectric conversion on the filtered beam to obtain an electric signal, and process the electric signal to obtain the vortex dichroism signal at the scanning position.

Optionally, a first phase distribution is loaded on the first liquid crystal spatial light modulator; and the first phase distribution is:

$$\Phi(\varphi) = \begin{cases} 0, & 2k\pi/2m \leq \varphi < (2k+1)\pi/2m \\ \pi, & (2k+1)\pi/2m \leq \varphi < (2k+2)\pi/2m \end{cases}.$$

$\Phi(\varphi)$ is the first phase distribution, and $\varphi$ is an angular coordinate of a photosensitive surface of the first liquid crystal spatial light modulator; k is a constant; and $\pi$ is pi.

Optionally, a second phase distribution is loaded on the second liquid crystal spatial light modulator; and the second phase distribution is:

$$\Phi_2(x, y) = \frac{2\pi d}{\lambda f}\left(y\tan^{-1}(y/x) - \frac{x}{2}\ln(x^2 + y^2) + px\right) + \tan^{-1}\left(\frac{\sum_{n=-1}^{1} b_n \sin\left(\frac{2\pi\theta}{\lambda}ny + a_n\right)}{\sum_{n=-1}^{1} b_n \cos\left(\frac{2\pi\theta}{\lambda}ny + a_n\right)}\right) - \frac{\pi}{\lambda f}(x^2 + y^2).$$

$\Phi_2(x, y)$ is the second phase distribution, and x, y are respectively an x coordinate and a y coordinate of a liquid crystal plane of the second liquid crystal spatial light modulator; $\pi$ is pi; d is a first debugging parameter; $\lambda$ is an illumination light wavelength; f is a lens phase focal length; p is a second debugging parameter; n is a constant, and n=−1, 0, or 1; $b_n$ is a third debugging parameter; $\theta$ is an angle, and $\theta=2\pi d/f$; and $a_n$ is a fourth debugging parameter.

Optionally, a third phase distribution is loaded on the third liquid crystal spatial light modulator; and the third phase distribution is:

$$\Phi_3(u, v) = \sum_{n=-1}^{1}\left[-\frac{2\pi d\exp(p-1)}{\lambda f}\exp(-u/d)\cos(v/d)rect\left(\frac{v-2\pi nd}{2\pi d}\right)\right] - \frac{\pi}{\lambda f}(u^2 + v^2).$$

$\Phi_3(u, v)$ is the third phase distribution, and u, v are respectively an x coordinate and a y coordinate of a liquid crystal plane of the third liquid crystal spatial light modulator; n is a constant, and n=−1, 0, or 1; $\pi$ is pi; d is a first debugging parameter; p is a second debugging parameter; $\lambda$ is an illumination light wavelength; and f is a lens phase focal length.

Optionally, said processing the electric signal to obtain the vortex dichroism signal at the scanning position specifically includes: superimposing signal of all signal channels in a first region of the electric signal to obtain first superimposed signal, and superimposing signal of all signal channels in a second region of the electric signal to obtain second superimposed signal, and calculating a difference between the first superimposed signal and the second superimposed signal to obtain the vortex dichroism signal at the scanning position, where the first region is a region composed of the signal channels corresponding to the first beam, and the second region is a region composed of the signal channels corresponding to the second beam.

According to specific embodiments provided in this application, this application discloses the following technical effects:

This application provides a vortex dichroism dark-field confocal microscopy measurement apparatus based on spiral transformation. An opposite-order vortex beam generation module is configured to generate a mixed vortex beam, a sample scanning module is configured to irradiate a scanning position of a to-be-measured sample by using the mixed vortex beam, to obtain a sample reflection beam of the scanning position. The to-be-measured sample is a 3D integrated circuit. A spiral transformation module is configured to spatially separate the sample reflection beam to obtain spatially separated beams. A multi-order detection module is configured to detect the spatially separated beams and obtain a vortex dichroism signal at the scanning position. When the scanning position of the to-be-measured sample is defect-free, the vortex dichroism signal is zero. Conversely, when defects are present at the scanning position, the vortex dichroism signal is non-zero. The positive and negative vortex dichroism signal respectively correspond to the chiral characteristics of the defects, a concept borrowed from biology used to measure defect asymmetry. The positive vortex dichroism signal indicates a right-handed defect, while the negative vortex dichroism signal indicates a left-handed defect. By determining the vortex dichroism signal at the scanning position, defect detection can be achieved along with characterization of the defect chirality. This allows for exploration of the chirality of interlayer defects in 3D integrated circuits.

BRIEF DESCRIPTION OF THE DRAWINGS

To describe the technical solutions in the examples of this application or in the prior art more clearly, the following briefly describes the accompanying drawings required for the examples. Apparently, the accompanying drawings in the following description show merely some examples of this application, and a person of ordinary skill in the art may still derive other accompanying drawings from these accompanying drawings without creative efforts.

FIG. 1 is schematic structural diagram of a vortex dichroism dark-field confocal microscopy measurement apparatus based on spiral transformation according to Embodiment 1 of this application.

REFERENCE NUMERALS

1—laser; 2—half-wave plate; 3—first polarizer; 4—first non-polarizing beam splitter; 5—first liquid crystal spatial light modulator; 6—beam expander; 7—aperture diaphragm; 8—second non-polarizing beam splitter; 9—objective lens; 10—to-be-measured sample; 11—XYZ translation stage; 12—second polarizer; 13—third non-polarizing beam splitter; 14—second liquid crystal spatial light modulator; 15—fourth non-polarizing beam splitter; 16—third liquid crystal spatial light modulator; 17—focusing lens; 18—slit array; and 19—linear array multianode photomultiplier tube.

DETAILED DESCRIPTION OF THE EMBODIMENTS

The technical solutions in embodiments of the present application are described below clearly and completely with reference to the drawings in the embodiments of the present application. Apparently, the described embodiments are merely part rather than all of the embodiments of the present application. All other embodiments obtained by those of ordinary skill in the art based on the embodiments of the present application without creative efforts should fall within the protection scope of the present application.

Embodiment 1

As shown in FIG. 1, this application provides a vortex dichroism dark-field confocal microscopy measurement apparatus based on spiral transformation, including:

An opposite-order vortex beam generation module is configured to generate a mixed vortex beam. The mixed vortex beam includes positive m-order orbital angular momentum and negative m-order orbital angular momentum, and m is a constant.

A sample scanning module configured to irradiate a scanning position of a to-be-measured sample 10 by using the mixed vortex beam, to obtain a sample reflection beam of the scanning position. The to-be-measured sample is a 3D integrated circuit, and the sample reflection beam includes positive m-order orbital angular momentum and negative m-order orbital angular momentum.

A spiral transformation module is configured to spatially separate the sample reflection beam to obtain spatially separated beams. The spatially separated beams include a first beam corresponding to the positive m-order orbital angular momentum and a second beam corresponding to the negative m-order orbital angular momentum, and the first beam and the second beam are separated in position.

A multi-order detection module is configured to detect the spatially separated beams to obtain a vortex dichroism signal at the scanning position, where the vortex dichroism signal is used to indicate whether there is a defect at the scanning position and a defect chirality if a defect exists.

In this embodiment, the opposite-order vortex beam generation module is configured to generate the mixed vortex beam containing orbital angular momentum with opposite orders (that is, positive m-order and negative m-order). Because the mixed vortex beam is used to irradiate the to-be-measured sample 10, the mixed vortex beam can be referred to as a mixed vortex illumination beam. The mixed vortex beam includes the positive m-order orbital angular momentum and the negative m-order orbital angular momentum, and m is a constant.

Specifically, the opposite-order vortex beam generation module includes a laser 1, a half-wave plate 2, a first polarizer 3, a first non-polarizing beam splitter 4, and a first liquid crystal spatial light modulator 5 sequentially arranged in a light propagation direction.

The laser 1 is configured to output parallel coherent laser light.

The half-wave plate 2 rotates the polarized light, and the polarizer shields and transmits incident light. The half-wave plate 2 and the first polarizer 3 are paired to adjust a polarization state of the parallel coherent laser light output by the laser 1, to ensure that an exit beam from the first polarizer 3 matches the first liquid crystal spatial light modulator 5.

The first non-polarizing beam splitter 4 is configured to split the exit beam from the first polarizer 3, to obtain a transmission beam and a reflection beam, and the transmission beam is incident on the first liquid crystal spatial light modulator 5.

The first liquid crystal spatial light modulator 5 is configured to perform phase modulation on the reflection beam of the first non-polarizing beam splitter 4, to generate the mixed vortex beam containing positive and negative m-order orbital angular momentum, and direct the mixed vortex beam to be incident on the first non-polarizing beam splitter 4.

A first phase distribution is loaded on the first liquid crystal spatial light modulator 5. By loading the first phase distribution, the first liquid crystal spatial light modulator 5 has the function of generating the mixed vortex beam containing the positive and negative m-order orbital angular momentum through phase modulation, such that the vortex beam emitted by the first liquid crystal spatial light modulator 5 contains both the positive and negative m-order orbital angular momentum.

The first phase distribution is:

$$\Phi(\varphi) = \begin{cases} 0, & 2k\pi/2m \leq \varphi < (2k+1)\pi/2m \\ \pi, & (2k+1)\pi/2m \leq \varphi < (2k+2)\pi/2m \end{cases}.$$

$\Phi(\varphi)$ is the first phase distribution, and $\varphi$ is an angular coordinate of a photosensitive surface of the first liquid crystal spatial light modulator 5; k is a constant, and k=0, 1, . . . ; $\pi$ is pi; and m is a constant. For example, m=1, 2, . . . , or 10.

The first non-polarizing beam splitter 4 is further configured to split the mixed vortex beam output by the first liquid crystal spatial light modulator 5, to obtain a transmission beam and a reflection beam. The transmission beam is incident on the sample scanning module, that is, the mixed vortex beam is transmitted to the sample scanning module through the first non-polarizing beam splitter 4.

In this embodiment, the sample scanning module is configured to transmit the mixed vortex beam to the to-be-measured sample 10, and irradiate the scanning position of the to-be-measured sample 10 by using the mixed vortex beam, to obtain the sample reflection beam of the scanning position. The sample reflection beam carries defect information of the scanning position, and therefore can be referred to as sample signal return light. The sample reflection beam includes the positive m-order orbital angular momentum and the negative m-order orbital angular momentum.

Specifically, the sample scanning module includes a beam expander 6, an aperture diaphragm 7, a second non-polarizing beam splitter 8, and an objective lens 9 sequentially arranged in the light propagation direction.

The beam expander 6 is configured to expand the mixed vortex beam to obtain an expanded beam. The expansion factor of the beam expander 6 may range from 3 to 5.

The aperture diaphragm 7 is configured to adjust the diameter of the expanded beam, to ensure that the diameter of the exit beam from the aperture diaphragm 7 matches an entrance pupil diameter of the objective lens 9.

The second non-polarizing beam splitter 8 is configured to split the exit beam from the aperture diaphragm 7, to obtain a transmission beam and a reflection beam, and the transmission beam is incident on the objective lens 9.

The objective lens 9 is configured to focus the transmission beam from the second non-polarizing beam splitter 8 to the scanning position of the to-be-measured sample 10, to obtain the sample reflection beam returned from the scanning position.

The objective lens 9 is further configured to collect the sample reflection beam and direct the sample reflection beam to be incident on the second non-polarizing beam splitter 8. The second non-polarizing beam splitter 8 is further configured to split the exit beam from the objective lens 9 to obtain a transmission beam and a reflection beam. The reflection beam is incident on the sample scanning module. In other words, the sample reflection beam is transmitted by the objective lens 9 and then reflected by the second non-polarizing beam splitter 8 to the spiral transformation module.

In order to adjust the scanning position, the sample scanning module in this embodiment further includes a XYZ translation stage 11, and the to-be-measured sample 10 is located on the XYZ translation stage 11. The XYZ translation stage 11 is controlled to move. The XYZ translation stage 11 is configured to drive the to-be-measured sample 10 to move, so as to adjust the scanning position of the to-be-measured sample 10. In this way, all positions on the to-be-measured sample 10 can be detected.

In this embodiment, the spiral transformation module adopts cascaded liquid crystal spatial light modulators to spatially separate the sample reflection beam containing orbital angular momentum with different orders (that is, positive and negative m-order), to obtain the spatially separated beams. The spatially separated beams include a first beam corresponding to the positive m-order orbital angular momentum and a second beam corresponding to the negative m-order orbital angular momentum, and the first beam and the second beam are separated in position.

Specifically, the spiral transformation module includes a second polarizer 12, a third non-polarizing beam splitter 13, a second liquid crystal spatial light modulator 14, a fourth non-polarizing beam splitter 15, and a third liquid crystal spatial light modulator 16 sequentially arranged in the light propagation direction.

The second polarizer 12 is configured to adjust the polarization state of the sample reflection beam, to ensure that the polarization state of the exit beam from the second polarizer 12 matches the second liquid crystal spatial light modulator 14 and the third liquid crystal spatial light modulator 16. The second liquid crystal spatial light modulator 14 and the third liquid crystal spatial light modulator 16 are configured to spatially separate the vortex light components (that is, the first beam and the second beam) corresponding to the positive and negative m-order orbital angular momentum in the sample reflection beam.

The third non-polarizing beam splitter 13 is configured to split the exit beam from the second polarizer 12, to obtain a transmission beam and a reflection beam, and the transmission beam is incident on the second liquid crystal spatial light modulator 14.

The second liquid crystal spatial light modulator 14 is configured to perform phase modulation on the transmission beam from the third non-polarizing beam splitter 13, to spatially separate the transmission beam containing orbital angular momentum with different orders, and shape the beams into strip-shaped distributed beams with significant distortion, to obtain preliminary separated beams. Each order of orbital angular momentum corresponds to a strip-shaped beam. The strip-shaped beams corresponding to multi-order orbital angular momentum are parallel, that is, the first beam and the second beam are strip-shaped.

A second phase distribution is loaded on the second liquid crystal spatial light modulator 14, and the second phase distribution is:

$$\Phi_2(x, y) = \frac{2\pi d}{\lambda f}\left(y\tan^{-1}(y/x) - \frac{x}{2}\ln(x^2 + y^2) + px\right) +$$

-continued $$\tan^{-1}\left(\frac{\sum_{n=-1}^{1} b_n \sin\left(\frac{2\pi\theta}{\lambda}ny + a_n\right)}{\sum_{n=-1}^{1} b_n \cos\left(\frac{2\pi\theta}{\lambda}ny + a_n\right)}\right) - \frac{\pi}{\lambda f}(x^2 + y^2).$$

$\Phi_2(x, y)$ is the second phase distribution, and x, y are respectively an x coordinate and a y coordinate of a liquid crystal plane of the second liquid crystal spatial light modulator 14; $\pi$ is pi; d is a first debugging parameter; $\lambda$ is an illumination light wavelength, that is, the wavelength of the parallel coherent laser light emitted by the laser 1;

$$\frac{\pi}{\lambda f}(x^2 + y^2)$$

is a lens phase, and f is a lens phase focal length; p is a second debugging parameter; n is a constant, and n=−1, 0, or 1; $b_n$ is a third debugging parameter, each n corresponds to one $b_n$, and $1 < b_n < 2$; $\theta$ is an angle, and $\theta = 2\pi d/f$; $a_n$ is a fourth debugging parameter. For example, $a_{-1} = -\pi/2$, $a_0 = 0$, and $a_1 = \pi/2$.

The first debugging parameter, the second debugging parameter, the third debugging parameter, and the fourth debugging parameter determine the spatial positions of the separated vortex light components corresponding to the positive and negative m-order orbital angular momentum.

The third non-polarizing beam splitter 13 is further configured to split the preliminary separated beams output by the second liquid crystal spatial light modulator 14, to obtain a transmission beam and a reflection beam, and the reflection beam is incident on the fourth non-polarizing beam splitter 15.

The fourth non-polarizing beam splitter 15 is configured to split the reflection beam from the third non-polarizing beam splitter 13, to obtain a transmission beam and a reflection beam, and the transmission beam is incident on the third liquid crystal spatial light modulator 16.

The third liquid crystal spatial light modulator 16 is configured to perform phase modulation on the transmission beam from the fourth non-polarizing beam splitter 15, to shape the severely distorted strip-shaped distributed beams into undistorted strip-shaped distributed beams, to obtain the spatially separated beams, and direct the spatially separated beams to be incident on the fourth non-polarizing beam splitter 15.

A third phase distribution is loaded on the third liquid crystal spatial light modulator 16, and the third phase distribution is:

$$\Phi_3(u, v) = \sum_{n=-1}^{1}\left[-\frac{2\pi d\exp(p-1)}{\lambda f}\exp(-u/d)\cos(v/d)rect\left(\frac{v - 2\pi nd}{2\pi d}\right)\right] - \frac{\pi}{\lambda f}(u^2 + v^2).$$

$\Phi_3(u, v)$ is the third phase distribution, and u, v are respectively an x coordinate and a y coordinate of a liquid crystal plane of the third liquid crystal spatial light modulator 16; n is a constant, and n=−1, 0, or 1; $\pi$ is pi; d is a first debugging parameter; p is a second debugging parameter; $\lambda$ is an illumination light wavelength; f is a lens phase focal length; and rect(A) is a rectangle function. If the absolute value of A is not greater than 0.5, rect(A)=1; or if the absolute value of A is greater than 0.5, rect(A)=0. A is the variable.

The fourth non-polarizing beam splitter 15 is further configured to split the preliminary separated beams, to obtain a transmission beam and a reflection beam, and the reflection beam is incident on a multi-order detection module. In other words, the spatially separated beams are reflected to the multi-order detection module through the fourth non-polarizing beam splitter 15.

In this embodiment, the multi-order detection module is configured to detect the spatially separated beams, specifically, to detect in a confocal mode the strength of the vortex light components corresponding to the multi-order (that is, positive and negative m-order) orbital angular momentum in the spatially separated beams, and record the strength of the vortex light components corresponding to the multi-order orbital angular momentum, respectively, so as to obtain the vortex dichroism signal at the scanning position. The vortex dichroism signal is used to indicate whether there is a defect at the scanning position and a defect chirality if a defect exists.

Specifically, the multi-order detection module includes a focusing lens 17, a slit array 18, and a linear array multi-anode photomultiplier tube 19 sequentially arranged in the light propagation direction.

The focusing lens 17 is configured to focus the spatially separated beams to obtain a focused beam.

The slit array 18 is configured to filter out defocused background in the focused beam to obtain a filtered beam. The spatial position of the slit array 18 is designed to correspond to the spatial position of the spatially separated beam, with slit width ranging from 50 μm to 100 μm.

The linear array multianode photomultiplier tube 19 is configured to perform photoelectric conversion on the filtered beam to obtain an electric signal, and process the electric signal to obtain the vortex dichroism signal at the scanning position.

The electric signal includes a plurality of signal channels. Because the positions of the first beam and the second beam in the spatially separated beams are separated, the signal channels corresponding to the first beam and the second beam are different. In this case, there are two signal channel regions in the electric signal whose signal is greater than a preset value (the preset value is the background strength), one corresponding to the first beam and the other corresponding to the second beam. The signal of all the signal channels within each signal channel region is superimposed, and then the two superimposition results are subtracted, such that the signal of the two brightest areas are separately superimposed and subtracted to obtain the vortex dichroism signal at the scanning position. In other words, processing the electric signal to obtain the vortex dichroism signal at the scanning position specifically includes: superimposing the signal of all signal channels in the first region of the electric signal, to obtain a first superimposed signal, superimposing the signal of all signal channels in the second region of the electric signal, to obtain a second superimposed signal, and calculating a difference between the first superimposed signal and the second superimposed signal, to obtain the vortex dichroism signal at the scanning position. The first region is a region composed of signal channels corresponding to the first beam, and the second region is a region composed of signal channels corresponding to the second beam.

In this embodiment, the first liquid crystal spatial light modulator 5 modulates the illumination light (that is, the parallel coherent laser light emitted by the laser 1), to generate a mixed vortex beam containing opposite-order orbital angular momentum, and irradiates the scanning position of the to-be-measured sample 10 by using the mixed vortex beam, to obtain the sample reflection beam. The second liquid crystal spatial light modulator 14 and the third liquid crystal spatial light modulator 16 are cascaded to demodulate the sample reflection beam, to quickly extract the strength of multi-order spiral spectrum components, so as to obtain the spatially separated beams. The spatially separated beams are detected to obtain the vortex dichroism signal at the scanning position. Because the surface reflection information of the to-be-measured sample does not show vortex dichroism, while the interlayer defect information of the to-be-measured sample is prone to generate vortex dichroism signals because of structural disorder, such that the surface reflection information and interlayer defect information can be differentiated. Whether there is a defect is determined based on the vortex dichroism signal, and the defect chirality is determined when the defect exists, which is beneficial to realize accurate defect detection of 3D integrated circuits.

In this embodiment, the workflow of the dark-field confocal microscopy measurement apparatus includes:

(1) A laser 1 outputs parallel coherent laser light in the visible light spectrum. After the polarization state of the parallel coherent laser light is adjusted by a half-wave plate 2 and a first polarizer 3, the laser light is reflected by a first non-polarizing beam splitter 4 to a first liquid crystal spatial light modulator 5, and is phase-modulated by the first liquid crystal spatial light modulator 5 to obtain a mixed vortex beam.

(2) The mixed vortex beam is transmitted to the beam expander 6 through the first non-polarizing beam splitter 4, and expanded by the beam expander 6. After the beam diameter is adjusted by the aperture diaphragm 7, the mixed vortex beam is transmitted to the objective lens 9 through the second non-polarizing beam splitter 8, and then focused to a scanning position of a to-be-measured sample 10 through the objective lens 9, to obtain a sample reflection beam. The to-be-measured sample 10 is controlled to move by a XYZ translation stage 11, to realize two-dimensional (2D) imaging or 3D imaging.

(3) The sample reflection beam is transmitted by the objective lens 9, then reflected by the second non-polarizing beam splitter 8 to the second polarizer 12. After the polarization state is adjusted by the second polarizer 12, the sample reflection beam is transmitted by the third non-polarizing beam splitter 13 to a second liquid crystal spatial light modulator 14. The second liquid crystal spatial light modulator 14 performs phase modulation to obtain preliminary separated beams.

(4) The preliminarily separated beams are reflected by the third non-polarizing beam splitter 13, and then transmitted to a third liquid crystal spatial light modulator 16 by a fourth non-polarizing beam splitter 15. The third liquid crystal spatial light modulator 16 performs phase modulation to obtain spatially separated beams.

(5) The spatially separated beams are reflected by the fourth non-polarizing beam splitter 15 to a focusing lens 17, and is focused by the focusing lens 17. After the defocused background is filtered by a slit array 18, the spatially separated beams are then incident on a linear array multi-anode photomultiplier tube 19. The linear array multianode photomultiplier tube 19 detects and records to obtain the vortex dichroism signal.

The conventional bright-field confocal measurement and dark-field confocal measurement can only determine the 3D positions of the to-be-measured sample 10 and defects on the to-be-measured sample 10. In this embodiment, the structures of the defects and the to-be-measured sample are described by using the vortex dichroism signal (that is, the difference in signal between the first and second beams corresponding to the positive and negative m-order orbital angular momentum). In regions without defects or micronano structures, the vortex dichroism signal is zero. Conversely, if defects exist, the vortex dichroism signal is non-zero. Furthermore, positive and negative vortex dichroism signal correspond to right-handed and left-handed chirality of defects, respectively. The positive strength corresponds to the right-handed chirality, and the negative strength corresponds to the right-handed chirality. This expands the dark-field confocal characterization capabilities and scope to realize chiral characterization of defects. In this way, identification and classification of defects can be achieved based on chiral characteristics, facilitating micronano structure identification and defect classification of the to-be-measured sample 10.

In this embodiment, the phase design of the first liquid crystal spatial light modulator 5 is utilized to achieve illumination with the positive and negative-order vortex light. Simultaneously, spiral transformation is employed to spatially separate vortex light components with different orders. The slit array 18 and the linear array multianode photomultiplier tube 19 are used for simultaneous detection of the separated vortex light components. This approach enhances the measurement speed of vortex dichroism, effectively mitigates stability issues caused by multiple measurements, and ensures high-reliability measurement of vortex dichroism.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A vortex dichroism dark-field confocal microscopy measurement apparatus based on spiral transformation, comprising:
an opposite-order vortex beam generation module configured to generate a mixed vortex beam, wherein the mixed vortex beam comprises positive m-order orbital angular momentum and negative m-order orbital angular momentum, and m is a constant;
a sample scanning module configured to irradiate a scanning position of a to-be-measured sample by using the mixed vortex beam, to obtain a sample reflection beam of the scanning position, wherein the to-be-measured sample is a three-dimensional (3D) integrated circuit, and the sample reflection beam comprises the positive m-order orbital angular momentum and the negative m-order orbital angular momentum;
a spiral transformation module configured to spatially separate the sample reflection beam to obtain spatially separated beams, wherein the spatially separated beams comprise a first beam corresponding to the positive m-order orbital angular momentum and a second beam corresponding to the negative m-order orbital angular momentum, and the first beam and the second beam are separated in position; and
a multi-order detection module configured to detect the spatially separated beams to obtain a vortex dichroism signal at the scanning position, wherein the vortex dichroism signal is used to indicate whether there is a defect at the scanning position and a defect chirality if a defect exists.

2. The vortex dichroism dark-field confocal microscopy measurement apparatus based on spiral transformation according to claim 1, wherein the opposite-order vortex beam generation module comprises a laser, a half-wave plate, a first polarizer, a first non-polarizing beam splitter, and a first liquid crystal spatial light modulator that are sequentially arranged in a light propagation direction; the first liquid crystal spatial light modulator is configured to perform phase modulation on a reflection beam of the first non-polarizing beam splitter, to obtain the mixed vortex beam; and the mixed vortex beam is transmitted to the sample scanning module through the first non-polarizing beam splitter.

3. The vortex dichroism dark-field confocal microscopy measurement apparatus based on spiral transformation according to claim 2, wherein a first phase distribution is loaded on the first liquid crystal spatial light modulator; and the first phase distribution is:

$$\Phi(\varphi) = \begin{cases} 0, & 2k\pi/2m \le \varphi < (2k+1)\pi/2m \\ \pi, & (2k+1)\pi/2m \le \varphi < (2k+2)\pi/2m \end{cases},$$

wherein
$\Phi(\varphi)$ is the first phase distribution, and $\varphi$ is an angular coordinate of a photosensitive surface of the first liquid crystal spatial light modulator; k is a constant; and $\pi$ is pi.

4. The vortex dichroism dark-field confocal microscopy measurement apparatus based on spiral transformation according to claim 1, wherein the sample scanning module comprises a beam expander, an aperture diaphragm, a second non-polarizing beam splitter, and an objective lens that are sequentially arranged in a light propagation direction; the objective lens is configured to focus transmission beam of the second non-polarizing beam splitter to the scanning position of the to-be-measured sample, to obtain the sample reflection beam of the scanning position; and the sample reflection beam is transmitted by the objective lens and then reflected by the second non-polarizing beam splitter to the spiral transformation module.

5. The vortex dichroism dark-field confocal microscopy measurement apparatus based on spiral transformation according to claim 4, wherein the sample scanning module further comprises a XYZ translation stage; the to-be-measured sample is located on the XYZ translation stage; and the XYZ translation stage is configured to drive the to-be-measured sample to move, to adjust the scanning position of the to-be-measured sample.

6. The vortex dichroism dark-field confocal microscopy measurement apparatus based on spiral transformation according to claim 1, wherein the spiral transformation module comprises a second polarizer, a third non-polarizing beam splitter, a second liquid crystal spatial light modulator, a fourth non-polarizing beam splitter, and a third liquid crystal spatial light modulator that are sequentially arranged in a light propagation direction; the second liquid crystal spatial light modulator is configured to perform phase modulation on a transmission beam of the third non-polarizing beam splitter to obtain preliminary separated beams; the third liquid crystal spatial light modulator is configured to perform phase modulation on a transmission beam of the fourth non-polarizing beam splitter, to obtain the spatially separated beams; and the spatially separated beams are reflected by the fourth non-polarizing beam splitter to the multi-order detection module.

7. The vortex dichroism dark-field confocal microscopy measurement apparatus based on spiral transformation according to claim 6, wherein a second phase distribution is loaded on the second liquid crystal spatial light modulator; and the second phase distribution is:

$$\Phi_2(x, y) = \frac{2\pi d}{\lambda f}\left(y\tan^{-1}(y/x) - \frac{x}{2}\ln(x^2 + y^2) + px\right) +$$

$$\tan^{-1}\left(\frac{\sum_{n=-1}^{1} b_n \sin\left(\frac{2\pi\theta}{\lambda}ny + a_n\right)}{\sum_{n=-1}^{1} b_n \cos\left(\frac{2\pi\theta}{\lambda}ny + a_n\right)}\right) - \frac{\pi}{\lambda f}(x^2 + y^2),$$

wherein $\Phi_2(x, y)$ is the second phase distribution, and x, y are respectively an x coordinate and a y coordinate of a liquid crystal plane of the second liquid crystal spatial light modulator; $\pi$ is pi; d is a first debugging parameter; $\lambda$ is an illumination light wavelength; f is a lens phase focal length; p is a second debugging parameter; n is a constant, and n=−1, 0, or 1; $b_n$ is a third debugging parameter; $\theta$ is an angle, and $\theta=2\pi d/f$; and $a_n$ is a fourth debugging parameter.

8. The vortex dichroism dark-field confocal microscopy measurement apparatus based on spiral transformation according to claim 6, wherein a third phase distribution is loaded on the third liquid crystal spatial light modulator; and the third phase distribution is:

$$\Phi_3(u, v) =$$

$$\sum_{n=-1}^{1}\left[-\frac{2\pi d\exp(p-1)}{\lambda f}\exp(-u/d)\cos(v/d)rect\left(\frac{v-2\pi nd}{2\pi d}\right)\right] - \frac{\pi}{\lambda f}(u^2 + v^2),$$

wherein $\Phi_3(u, v)$ is the third phase distribution, and u, v are respectively an x coordinate and a y coordinate of a liquid crystal plane of the third liquid crystal spatial light modulator; n is a constant, and n=−1, 0, or 1; $\pi$ is pi; d is a first debugging parameter; p is a second debugging parameter; $\lambda$ is an illumination light wavelength; and f is a lens phase focal length.

9. The vortex dichroism dark-field confocal microscopy measurement apparatus based on spiral transformation according to claim 1, wherein the multi-order detection module comprises a focusing lens, a slit array, and a linear array multianode photomultiplier tube that are sequentially arranged in a light propagation direction; the focusing lens is configured to focus the spatially separated beams to obtain a focused beam; the slit array is configured to filter out defocused background in the focused beam, to obtain a filtered beam; and the linear array multianode photomultiplier tube is configured to perform photoelectric conversion on the filtered beam to obtain an electric signal, and process the electric signal to obtain the vortex dichroism signal at the scanning position.

10. The vortex dichroism dark-field confocal microscopy measurement apparatus based on spiral transformation according to claim 9, wherein said processing the electric signal to obtain the vortex dichroism signal at the scanning position specifically comprises: superimposing signal of all signal channels in a first region of the electric signal to obtain first superimposed signal, and superimposing signal of all signal channels in a second region of the electric signal to obtain second superimposed signal, and calculating a difference between the first superimposed signal and the second superimposed signal to obtain the vortex dichroism signal at the scanning position, wherein the first region is a region composed of the signal channels corresponding to the first beam, and the second region is a region composed of the signal channels corresponding to the second beam.

* * * * *